United States Patent
Reinecke

[15] 3,659,420
[45] May 2, 1972

[54] BRAKE SYSTEM FOR VEHICLES

[72] Inventor: Erich Reinecke, Hannover, Germany

[73] Assignee: Westinghouse Bremsen-und Apparatebau G.m.b.H., Hannover, Germany

[22] Filed: Aug. 19, 1970

[21] Appl. No.: 65,030

[52] U.S. Cl. .......................60/54.5 HA, 417/225, 303/6 C
[51] Int. Cl. ..................F15b 7/00, B60t 13/00, F04b 17/00, F04b 35/00
[58] Field of Search .....................417/225; 303/6 R, 6 C, 10, 303/11; 60/54.5 HA, 54.6 HA

[56] References Cited

UNITED STATES PATENTS

| | | | |
|---|---|---|---|
| 1,970,999 | 8/1934 | Ferris et al. | 60/54.5 HA |
| 3,010,283 | 11/1961 | Jansson | 60/54.6 HA |
| 3,377,108 | 4/1968 | Eddy | 303/6 C X |

*Primary Examiner*—Robert M. Walker
*Attorney*—Ralph W. McIntire, Jr.

[57] ABSTRACT

A fluid pressure brake system having a common master cylinder for providing control braking pressure for brake cylinders on both the front and rear axles of a vehicle, said brake system being characterized by a fluid pressure regulator effective, subsequently to initiation of supply thereto of control pressure from the master brake cylinder and during low range braking up to a certain degree of said control pressure, for effecting delivery of respective braking pressures to the front and rear axle cylinders at one proportion such that the braking pressure at the front axle cylinders increases responsively to increasing control pressure at a lesser rate than the rate of increase at the rear axle cylinders, said fluid pressure regulator being operative responsively to said control pressure in excess of said certain degree during high range braking for effecting delivery of braking pressures to the front and rear axle brake cylinders at a different proportion such that the increase in said delivered pressure to the front axle cylinders, during progressive increase in control pressure occurs at a rate greater than that at the rear axle cylinders to compensate for inertially induced axle load displacement as the vehicle retardation increases.

7 Claims, 3 Drawing Figures

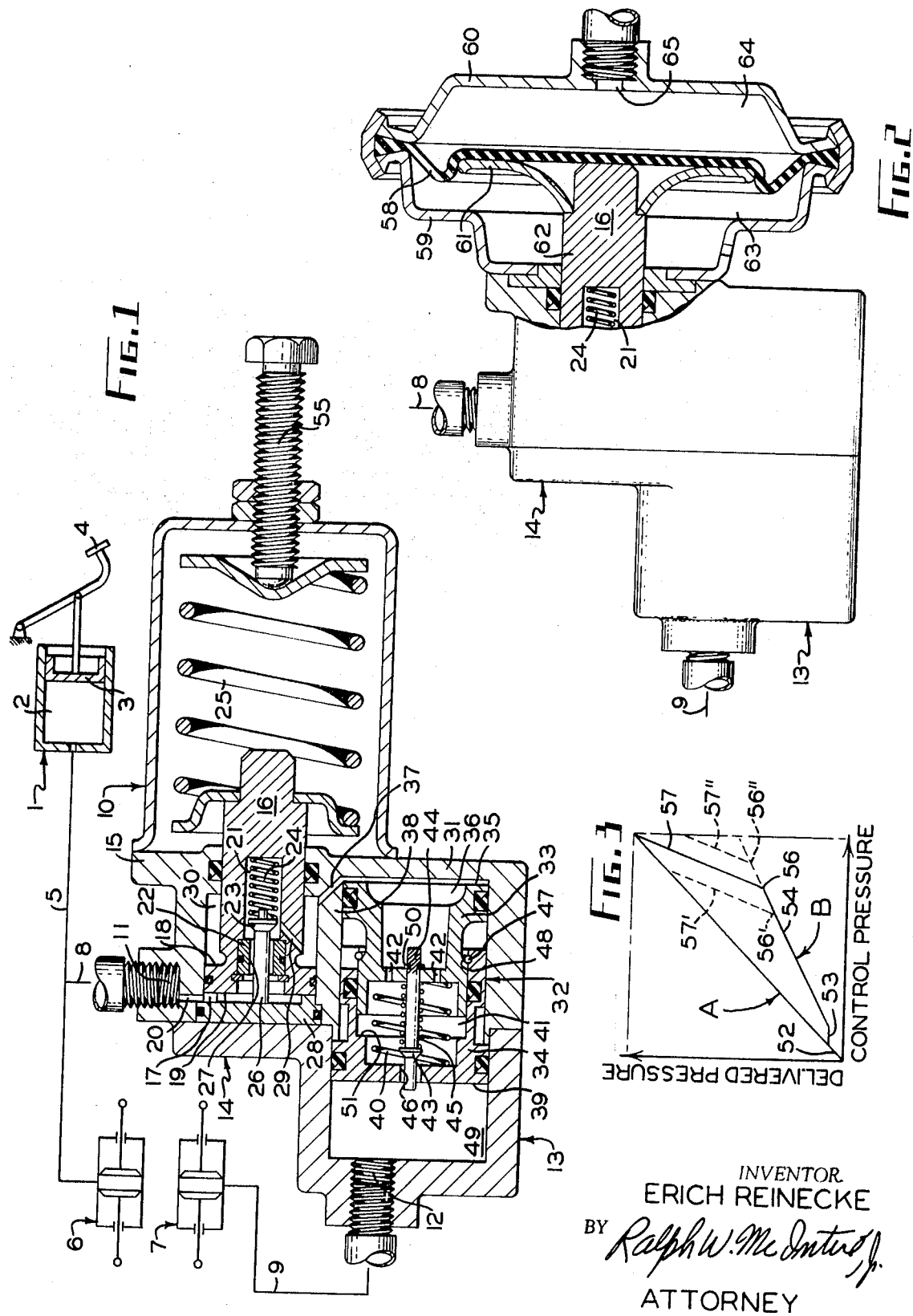

BRAKE SYSTEM FOR VEHICLES

BACKGROUND OF THE INVENTION

As is well-known to those skilled in the art, application of retarding forces on a vehicle results in inertially induced axle load displacement from the rear axle to the front axle of the vehicle, with the degree of such axle load displacement increasing as the braking forces are increased. With the use of conventional brake systems, the tendency to over-apply braking effort, particularly directly following initiation of the braking operation when inertially induced axle load displacement is at a minimum, may result in wheel lock under certain conditions, such as on a smooth road surface. Other types of existing brake systems automatically adjust brake pressures to the rear axle cylinders in accordance with the load thereon, the brake pressure supplied to the front axle cylinders being proportional to that of said rear axle cylinders. Such brake systems, however, do not take into account the inertially induced axle load displacement, which is most critical during the higher range braking operations.

SUMMARY OF INVENTION

The object of the present invention therefore, is to provide brake apparatus operable for effecting, subsequently to initiation of and during low range braking operations, a lesser braking effort on the front axle cylinders than on the rear axle cylinder, at a fixed, predetermined ratio, and, upon attainment of a certain higher degree of retardation, that is, upon transition into a high range of braking operations, for effecting, in response to progressively increasing braking pressure effected by the operator, an increase in braking pressure at the front axle cylinders at a greater rate than at the rear axle cylinders until a 1:1 ratio is realized at both front and rear axle cylinders when maximum or full braking pressure deliverable thereto has been attained.

The brake apparatus embodying the invention comprises a conventional master cylinder for commonly supplying control pressure and, consequently, braking pressure, via respective branch lines, to both the front and rear axle brake cylinders. A fluid pressure regulator comprising a low range differential piston unit arranged in series with high range differential piston means, is interposed on the branch line leading to the front axle brake cylinders. The low range differential piston unit is operable responsively to control pressure from the master brake cylinder for momentarily providing braking pressure at front axle cylinders equal to that delivered to the rear axle cylinders. However, upon increase of control pressure from the master cylinder above a certain, relatively low value, said low range differential piston unit is operative for providing braking pressure in a first ratio relative to said control pressure (as determined by the pressure areas of the differential piston unit) to the front axle cylinders at a degree less than that delivered to the rear axle cylinders and such that the rate of increase of braking effort at the front axle cylinders, as control pressure is increased, occurs at a lesser rate than at the rear axle cylinders during low range braking. The high range differential piston means is operable responsively to increase of control pressure from the master cylinder to a certain high degree to a position in which the smaller pressure area of the low range differential piston unit is effectively increased to thereby provided braking pressure to the front axle cylinders, for high range braking operations and such that the rate of increase of front cylinder braking effort, as control pressure is increased, occurs at a higher rate than that at the rear cylinders during high range braking operations until braking pressures at both the front and rear cylinders are equal at maximum control pressure available from the master brake cylinder.

In the drawing,

FIG. 1 is a cross-sectional view of a fluid pressure regulator as disposed in a schematic arrangement of a conventional brake system;

FIG. 2 is a cross-sectional view of a modified form of the regulator shown in FIG. 1; and FIG. 3 is a graphic representation of the relationship between control pressures and delivery pressure during low range and high range braking operations, respectively.

DESCRIPTION AND OPERATION

A conventional hydraulic brake system is basically illustrated in FIG. 1, said brake system comprising a master brake cylinder 1 having a fluid chamber 2 and a piston 3 for transmitting pressure to said fluid when applied to a foot pedal 4 operatively connected thereto, said pressurized fluid being transmitted via a conduit or pipe 5 to conventional brake cylinders 6 (only one of which is shown) of the rear axle of a vehicle (neither of which is shown) and to conventional brake cylinders 7 (only one which is shown) of the front axle (not shown) via a branch conduit or pipe comprising two sections 8 and 9 each connected at one end to pipe 5 and the brake cylinders 7, respectively.

According to the invention, a fluid pressure regulator, generally indicated by the reference numeral 10, is interposed between the pipe sections 8 and 9 with said pipes 8 and 9 being connected, respectively, to an inlet 11 and an outlet 12 of said regulator.

The fluid pressure regulator 10 comprises a low range braking or pressure reducing portion 13, which effects delivery of pressurized fluid from the master brake cylinder 1 to the front axle cylinders 7 at a pressure less than that delivered to the rear axle cylinders 6 and at a first ratio during low range braking operations. The regulator 10 further comprises a high range braking portion 14 which, in cooperation with the low range braking portion 13 and in response to control pressure established by master brake cylinder 1 exceeding a certain value and thereafter gradually increased, effects delivery of pressurized fluid to the front axle cylinders 7, at a higher ratio than the above-mentioned first ratio and at an increasing rate greater than the increasing rate of pressurized fluid delivered to the rear axle cylinders 6 until maximum or full braking control pressure is attained, at which point the ratio of the delivered pressures to the front and rear cylinders, respectively, attains a 1:1 ratio.

The high range braking portion 14 comprises a casing section 15 having disposed therein high range differential piston means including a reciprocable high pressure piston 16 having on opposite sides thereof larger and smaller pressure areas 17 and 18, respectively said larger pressure area being subject to pressurized fluid or control pressure from the master brake cylinder device 1 in an adjacent inlet or control pressure chamber 19 connected to inlet 11 via a passageway 20 formed in said casing.

Piston 16 is provided with an internally coaxially disposed recess 21 closed at one end and opening at the other end to chamber 19, said recess having an annular valve seat member 22 coaxially fixed therein for movement with the piston. Also disposed in the recess 21 is a valve member 23 which is biased by a spring 24 toward a seated position on the valve seat member 22. Piston 16 is biased by a pressure spring 25 to a normal or low range position in which the valve member 23 occupies an unseated position relative to the valve seat member 22. Valve member 23 is provided with a valve stem 26 extending in axial alignment therefrom through a coaxial bore 27 formed in the valve seat member 22. Valve stem 26 is of such length that, when the free end thereof is resting against an end wall 28 of casing 15, as occurs when piston 16 assumes its normal position also resting against said end wall, valve member 23 is lifted off the valve seat member 22 to its unseated position relative thereto. When piston 16 is moved out of its normal or low range position, in a manner to be hereinafter set forth, to a high range position, such movement of said piston is sufficient to carry the valve seat member 22 into seated relation with valve member 23 which is thereafter held in such seated position by spring 24 until said piston resumes its said normal position. Recess 21 is connected, via a passageway 29 formed in the wall of piston 16, to a first intermediate chamber 30 adjacent the smaller pressure area 18.

The low range braking portion 13 comprises a casing section 31 in which a telescoping low pressure piston unit 32 is reciprocably disposed for controlling delivery of pressurized fluid to the front axle cylinders 7 during low range braking operations and, cooperatively with high pressure piston 16 of the high range braking portion 14, during high range braking operations. Low pressure piston unit 32 comprises a first piston portion 33 having one end coaxially and telescopically disposed within an adjacent end of a second piston portion 34. The first piston portion 33 has a pressure area 35 at the end thereof opposite second piston portion 34, said pressure area being subject to prevailing fluid pressure in a pressure transfer chamber comprising the first intermediate chamber 30 in high range portion 14 and a second intermediate chamber 36 formed in low range portion 13 adjacent said pressure area, said first and second intermediate chambers being in constant communication with each other, to form said transfer chamber, via a passageway 37 formed in a separating wall 38 disposed between said high range and low range portions. For a purpose to be hereinafter disclosed, the second piston portion 34 is provided with a pressure area 39 larger than pressure area 35 of first piston portion 33 and at the opposite end of piston unit 32.

The two piston portions 33 and 34 are biased to an extended normal or initial position by a spring 40 compressed in a spring chamber 41 formed between said two piston portions, said spring chamber being in communication with the second intermediate chamber 36 via a plurality of openings 42 formed in the bottom end of piston portion 33 separating said chambers. Also disposed in spring chamber 41 is a valve member 43 having a valve stem 44 slidably extending through a concentric bore formed in the bottom end of first piston portion 33.

The valve member 43 is biased by a spring 45 encircling stem 44 and compressed between the valve member and the bottom end of first piston portion 33, from an open or unseated position toward a closed or seated position on an opening 46 extending through the bottom end of second piston portion 34. With the piston portions 33 and 34 in their extended or initial position, which is defined by engagement of a stop ring 47, carried by first piston portion 33, with a shoulder 48 formed on second piston portion 34, valve member 43 is held in its unseated or open position relative to opening 46 to thereby communicate spring chamber 41 with an outlet or pressure delivery chamber 49. In the extended position of the piston portions 33 and 34, a stop ring 50 encircling the valve stem 44 on the portion thereof extending into second intermediate chamber 36, comes into abutting contact with the bottom end of the first piston portion, said stop ring being axially positioned on said valve stem such that the length of that portion of said stem extending into spring chamber 41 and carrying valve member 43 is short of seating said valve member on the opening 46 when said piston portions are in said extended position. However, when in a manner to be hereinafter explained, the first piston portion 33 is telescoped into the second piston portion 34 to a power-coupled position, which is defined by engagement of said first piston portion with an annular shoulder 51 formed internally of said second piston portion in spring chamber 41, such relative movement of said piston portions brings the opening 46 of the second piston portion into seated relation with valve member 43 to thereby cut off communication between outlet chamber 49 and spring chamber 41.

Operation of the brake apparatus embodying the invention is initiated in the usual manner by application of pressure on the brake pedal 4 of the master brake cylinder 1 by the operator, said pressure being transmitted by the piston 3 to the fluid chamber 2, which, for purposes of this operational description, will be assumed to be hydraulic fluid, it being understood, however, that any other type of suitable fluid such as compressed air, for example, may be employed. Since the system is completely filled with hydraulic fluid, hydraulic or control pressure, to the extent thus applied at the pedal 4, is transmitted directly through pipe 5 to the rear axle cylinders 6 to effect retardation forces on the rear wheels (not shown) accordingly.

Control pressure from the master brake cylinder 1 is also concurrently transmitted through pipe 5 and pipe section 8, via inlet 11 and passageway 20 to inlet chamber 19 of the fluid pressure regulator 10. From inlet chamber 19 control pressure is transmitted through bore 27, past unseated valve member 23, via recess 21, passageway 29, intermediate chamber 30, passageway 37, intermediate chamber 36 of the low range braking portion 13, openings 42, spring chamber 41, and opening 46, to thus become delivered pressure at outlet chamber 49, which delivered pressure is transmitted through outlet 12 and pipe section 9 to the front axle brake cylinders 7. At the onset of a brake application, therefore, the braking forces applied to both the rear and front wheels are momentarily equal. This condition, wherein the delivered pressures, and therefore braking forces, at both the front and rear cylinders 6 and 7, respectively, are equal, is illustrated graphically in FIG. 3 by a small segment 52 of a curve A, said small segment representing the coinciding braking pressures and application rates thereof at both said front and rear axle cylinders at the onset of braking operations, while the remainder of curve A represents the rate of continued braking pressure application at the rear axle cylinders, as will be presently more fully described.

As the pressure on brake pedal 4 is increased, the increased control pressure resulting on the hydraulic fluid in the master brake cylinder 1 is transmitted via the course above described to the rear axle brake cylinders 6 in a straight line relationship indicated by curve A in FIG. 3.

The increased control pressure reaching intermediate chamber 36 of the low range portions 13, however, and acting on pressure area 35 of first piston portion 33, if increased sufficiently, overcomes the opposing force of spring 40 (because the area of said first piston portion adjacent spring chamber 41, though subject to said control pressure also, is smaller than area 35) and causes telescoping of said first piston portion into second piston portion 34 to the power coupled relationship, above described. As was above noted, in the power-coupled relationship of the first and second piston portions 33 and 34, valve member 43 is seated on opening 46 to cut off direct communication therethrough to outlet chamber 49 and consequently to brake cylinders 7. Prevailing control pressure now acting on the pressure area 35 of first piston portion 33, therefore, is transmitted through the power-coupled piston unit 32 to outlet chamber 49 at a reduced value since area 39 adjacent said outlet chamber is larger than area 35. This condition prevails as long as no further increase in control pressure is effected at the master brake cylinder 1, said condition or relationship of control pressure to delivery pressure, with respect to the front axle cylinders 7, being represented by a level segment 53 of a curve designated B which represents the braking action of the front axle cylinders.

Thereafter, if successive increases of control pressure are effected at the master brake cylinder 1 up to a certain value to be hereinafter explained, such increased pressure is effected at the rear axle cylinders 6 at the rate represented by curve A in FIG. 3, whereas such increased pressure, though also delivered to the front axle cylinders 7, is transmitted thereto through the power-coupled piston unit 32 and therefore, as previously explained, is proportionally reduced according to the fixed ratio of pressure area 35 to pressure area 39. Thus the rate of increase of delivered pressure to the front axle cylinders 7 during this period of low range braking is less than the rate of increase of delivered pressure to the rear axle cylinders 6, said rate of increase on the front axle cylinders 7 being represented graphically by a segment 54 of curve B in FIG. 3.

Assuming further increases in control pressure, effected by the master brake cylinder 1, into a high pressure range exceeding the certain high value referred to above, such increased pressure acting on pressure area 17 of high pressure piston 16 is sufficient for overcoming the combined opposition of spring 25 and of pressure acting on area 18, said certain high value being determined by the compression setting of said spring which is adjustable in conventional manner by an adjusting screw 55. In response to such pressure exceeding the certain high value, piston 16 is moved in a right-hand direction, as viewed in the drawing, to its high range position, herein before defined, in which valve member 23 is seated on valve seat member 22 and retained thereon by spring 24 as long as said piston is in said high range position. The point at which movement of piston 16 to its high range position occurs is indicated graphically by the reference numeral 56 on curve B in FIG. 3.

With valve member 23 closed, control pressure is no longer transmitted through bore 17 of the valve seat member 22, but is now transferred by the high range piston 16 itself, that is, control pressure of fluid acting on pressure area 17 is transferred by pressure area 18 to fluid trapped in the transfer chamber between said high range piston and the low range piston unit 32. Since pressure area 18 is smaller than pressure area 17, the degree of existing control pressure in inlet chamber 19 is amplified, when transferred by piston 16, in accordance with the ratio of pressure area 17 to pressure area 18, so that the progressive increase of delivered pressure to the front axle cylinders 7 (which remains less than that delivered to the rear cylinders 6 until maximum or full braking control pressure is attained) now occurs at a rate greater than that occuring in the rear cylinders 6, such rate of increase as occurs in the front cylinders 7 during high range braking being represented graphically by a segment 57 of curve B in FIG. 3. The rate of increase represented by segment 57 continues until control pressure reaches a maximum or full braking value attainable at the master brake cylinder 1. At the maximum value of control pressure, the degree of delivered pressure at both the front axle cylinders 7 and the rear axle cylinders 6 coincide, as is shown by the intersection of curves A and B in FIG. 3.

A modified version of the fluid pressure regulator 10 is shown in FIG. 2, wherein the spring 25 is replaced by a diaphragm 58 having the periphery thereof clamped between two housing sections 59 and 60. Diaphragm 58 is concentrically fixed to a diaphragm follower 61 which engages a stem portion 62 of high pressure piston 16. Diaphragm 58 cooperates with casing section 59 to form an atmospheric chamber 63 and with casing section 60 to form a pressure chamber 64.

Pressure chamber 64 may be connected via a port 65 either to a source of fluid maintained at a constant pressure (such as the main storage reservoir of a compressed air system) or to a source of fluid whose pressure is variable (such as air spring pressure which varies according to load). If chamber 64 is connected to a constant pressure source, a regulating valve device (not shown) may be employed to regulate the degree of fluid pressure in chamber 64, which pressure, acting on piston 16 through diaphragm 58, acts in a similar manner as spring 25 (adjustable by screw 55) in FIG. 1 for maintaining a preselected biasing effect on said piston.

If chamber 64 is connected to air spring pressure, the biasing effect on piston 16 varies according to the load condition of the vehicle to thereby effect braking action on the front axle cylinders 7 accordingly only to the extent that point 56 on curve B, that is, the degree of control pressure from master cylinder 1 at which piston 16 is operated to its high range position, may occur either at a lower value or a higher value as designated by the reference numerals 56' and 56", respectively, in FIG. 3. The fluid pressure regulator 10 with diaphragm 58, however, operates during high range braking operations in similar fashion as when equipped with spring 25, so that the rates of increases in delivered pressures are the same when starting from any one of the points 56, 56', or 56". Hence the high range braking operations starting from points 56' and 56" are represented by segments 57' and 57", respectively, of curve B parallel to segment 57. It will be observed, however, that the points of intersection of segments 57' and 57" with curve A occur before and after, respectively, the point of intersection of segment 57 with curve A.

Having now described the invention, what I claim as new and desire to secure by Letters Patent, is:

1. A fluid pressure regulator, comprising:
   a. a casing having therein a control chamber chargeable with fluid under pressure, a transfer chamber, and a delivery chamber;
   b. differential piston means operably disposed in said casing with the larger end thereof adjacent said control chamber and the smaller end adjacent said transfer chamber;
   c. first passage means normally open for communicating said control chamber with said transfer chamber;
   d. first valve means interposed in said first passage means, said first valve means having an open position, in which communication through said first passage means is open, and being operable to a closed position in which said communication is closed;
   e. first biasing means acting, cooperatively with fluid pressure prevailing in said transfer chamber, on the smaller end of said differential piston means for exerting thereon a combined force biasing said differential piston means toward a low range position in which said first valve means is operated to its said open position, said differential piston means being operable responsively to a preponderance of fluid pressure in said control chamber acting on the larger end thereof over said combined force acting on the smaller end thereof, to a high range position in which said first valve means is operated to its said closed position; and
   f. A differential piston unit operably disposed in said casing in series with said differential piston means and with the smaller end of said piston unit adjacent said transfer chamber and the larger end thereof adjacent said delivery chamber,
   g. said differential piston unit being operable, in response to control pressure in said control chamber acting on and transmitted to the smaller end of said differential piston unit via said first passage means and said transfer chamber and with said differential piston means in its low range position, to provide delivery pressure in said delivery chamber in a first proportion, as related to control pressure in the control chamber, for low range control pressures, and with said differential piston means in its said high range position, in which the smaller end of said differential piston unit is effectively enlarged to provide delivery pressure in said delivery chamber in a higher proportion than said first proportion, as related to control pressure in the control chamber.

2. A fluid pressure regulator, as set forth in claim 1, wherein said first passage means is formed in said differential piston means.

3. A fluid pressure regulator, as set forth in claim 1, wherein said first biasing means comprises a diaphragm member secured to said differential piston means adjacent the smaller end thereof with fluid pressure acting on said diaphragm member.

4. A fluid pressure regulator, as set forth in claim 3, further characterized in that said pressure acting on said diaphragm member is variable.

5. A fluid pressure regulator, as set forth in claim 1, wherein said differential piston unit comprises:
   a. second passage means formed in said differential piston unit, said differential piston unit normally occupying an initial position in which said second passage means is open for communicating said delivery chamber with said transfer chamber and effecting equalization of pressure therebetween as long as control pressure in said transfer and delivery chambers remains at a value below a certain low degree, said differential piston unit being operable, in response to control pressure in said transfer chamber in excess of said certain low degree acting on and transmitted to the larger end of said differential piston unit via said second passage means, to a power-coupled position in which said second passage means is closed for providing said delivery pressure in said first proportion; and b. second valve means disposed in said second passage means and operable, in response to movement of said differential piston unit to its said power-coupled position, to a closed position in which communication through said second passage means is closed.

6. A fluid pressure regulator, as set forth in claim 5, wherein said differential piston unit further comprises:
a. a first piston portion one end of which comprises said smaller end of the piston unit;
b. a second piston portion one end of which comprises said larger end of the piston unit,
c. said first piston portion having the other end thereof telescopically and coaxially disposed in the other end of said second piston portion; and
d. biasing means interposed between said first and second piston portions for axially extending said first and second piston portions to said initial position, said biasing means being yieldable to and rendering said control pressure in excess of said certain degree acting on said one end of said second piston portion effective for operating said first and second piston portions to said power-coupled position.

7. A fluid pressure regulator, as set forth in claim 6, wherein said first and second piston portions are in rigid abutting relation when in said power-coupled position.

* * * * *